United States Patent [19]

Wilson

[11] 4,278,221
[45] Jul. 14, 1981

[54] AGRICULTURE SPRAY PLANE

[75] Inventor: Weldon D. Wilson, Boise, Id.

[73] Assignee: Eagle Aircraft Co., Boise, Id.

[21] Appl. No.: 95,778

[22] Filed: Nov. 19, 1979

[51] Int. Cl.³ .............................................. B64D 1/18
[52] U.S. Cl. .................................... 244/136; 239/171
[58] Field of Search ................... 244/136, 90 R, 90 A, 244/213, 214, 13, 45 R, 123; 239/171; 169/53

[56] References Cited

U.S. PATENT DOCUMENTS

| | | | |
|---|---|---|---|
| 1,280,195 | 10/1918 | Eaton | 244/90 R |
| 1,336,977 | 4/1920 | Morse | 244/90 R |
| 1,830,931 | 11/1931 | Congdon | 244/90 R |
| 2,000,666 | 5/1935 | Osborn et al. | 244/90 R |
| 2,426,771 | 9/1947 | Harp | 244/136 |
| 2,549,044 | 4/1951 | Ashkenas et al. | 244/90 A |
| 2,772,061 | 11/1956 | Sellers | 244/136 |
| 2,812,913 | 11/1957 | Nissen | 244/136 |
| 3,204,895 | 9/1965 | Razak | 244/136 |
| 3,887,129 | 6/1975 | Brown | 239/171 |
| 3,933,309 | 1/1976 | Odegaard | 244/136 |

Primary Examiner—Galen L. Barefoot
Attorney, Agent, or Firm—Paul F. Horton

[57] ABSTRACT

An improved agricultural spray plane of the biplane type, the improvement including a pair of spray booms mounted on each of the lower wings and defining the trailing edge of each of the wings for substantially the entire length of the wings. A spoiler is mounted on the upper surface of each of the lower wings forward of the spray booms to compensate for the elimination of ailerons found on conventional biplanes. Each of the upper wings include an aileron and apparatus for simultaneously controlling ailerons and spoilers is also provided.

7 Claims, 5 Drawing Figures

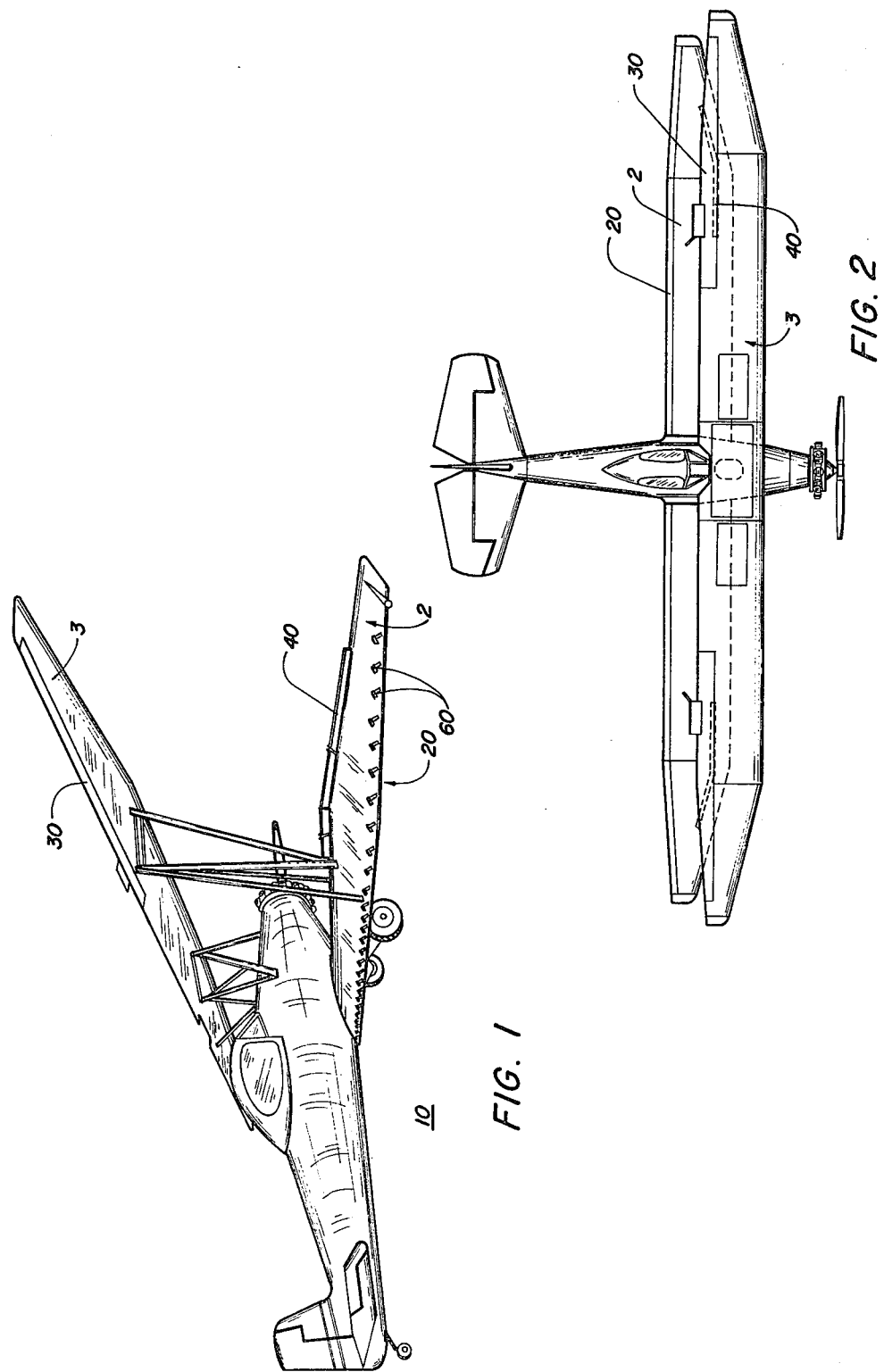

AGRICULTURE SPRAY PLANE

BACKGROUND OF THE INVENTION

1. Field of the Invention

This invention relates, in general, to biplanes, and in particular, to biplanes equipped with spraying apparatus for agricultural purposes.

2. Description of the Prior Art

Biplanes excel in their use as agricultural spray planes because of their large lift capacity and their maneuverability. Conventional spray planes, of the biplane type, have spraying booms of generally tubular structure which are mounted on the wings parallel with the trailing edge of the wings and generally below and rearward of the wings. The booms are equipped with laterally spaced spraying nozzles. This type of boom significantly increases the air drag of the aircraft thereby making the plane less maneuverable and lowering the amount of spray material which the aircraft can carry. Additionally, conventional biplanes include ailerons on both upper and lower wings which extend to include the trailing edge of the wings, thereby preventing a continuous boom across the expanse of each wing immediately adjacent the trailing edge. Where booms are mounted adjacent the trailing edge of the wing the connecting tubes between the boom sections must, of necessity, be routed around the ailerons, also causing air drag. U.S. Pat. No. 3,933,309 to R. J. Odegaard and U.S. Pat. No. 2,426,771 issued to C. B. Harp typify the present state of the art.

SUMMARY OF THE INVENTION

The present invention is an improvement of agricultural spray planes of the biplane type, the improvement comprising a pair of spray booms mounted on and defining a continuous trailing edge of each of the lower wings, elimination of the conventional lower ailerons and inclusion of a spoiler on each of the lower wings forward of the spray booms, an aileron mounted on each of the upper wings, and means for simultaneously controlling ailerons and spoilers. A more comprehensive description may be found in the appended claims.

It is, therefore, a primary object of the present invention to provide an agricultural spray plane of the biplane type having a continuous, drag-free, boom adjacent the trailing edge of each of the lower wings for substantially the length of the wings.

It is a further object to the present invention to provide an agricultural spray plane, of the biplane type, having a boom which is integral with the trailing edge of the lower wings. Additional objects and advantages will become apparent and a more thorough and comprehensive understanding may be had from the following description taken in conjunction with accompanying drawings forming a part of this specification.

BRIEF DESCRIPTION OF THE DRAWINGS

FIG. 1 is a rear perspective view of the agricultural spray biplane of the present invention.

FIG. 2 is a plan view of the biplane of FIG. 1.

DETAILED DESCRIPTION OF THE INVENTION

Figure 3:
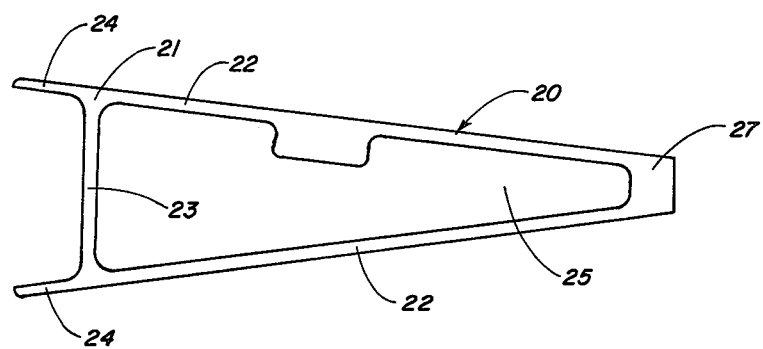
FIG. 3 is a cross section of one embodiment of the boom of the present invention.
Figure 4:
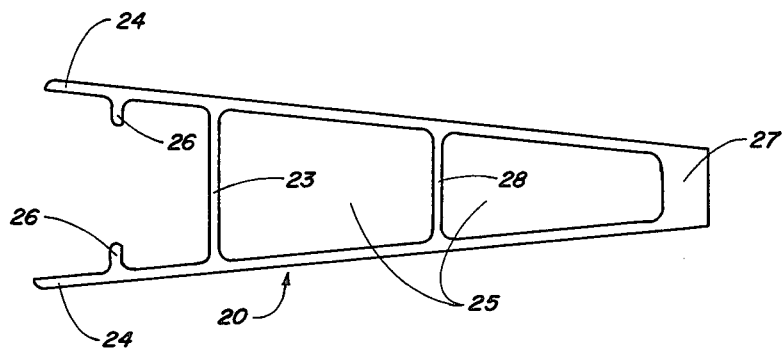
FIG. 4 is a cross section of a second embodiment of the boom of the present invention.

Referring now to the drawings, an improved agricultural spray plane 10 embodying the concepts of the present invention are shown to advantage. Spray plane 10 includes spray booms 20 forming the trailing edge of lower wings 2, spoilers 40 pivotally mounted on the upper surface of lower wing 2, ailerons 30 on upper wings 3, and aileron-spoiler control means designated generally by the numeral 50.

Ailerons 30 of the present invention, are conventional in that they define the hinged rear portion of upper wings 3 of spray plane 10 and are moved differentially on each side of the plane to obtain lateral or roll control moments. Deflection of the ailerons change the effective camber, or air foil curvature relative to the wing cord, of the entire wing forward of the aileron. With the trailing edge deflected upward, reduced air flow velocities are produced on the upper wing surface and increased air flow velocities are produced on the lower wing surface resulting in a reduction of lift on the wing forward of the aileron and on the aileron itself. Conversely, downward deflection of the trailing edge increases the lift. The ailerons are so controlled, as will hereinafter be explained, that a decrease in lift on one wing is accompanied by a lift increase on the other wing. This differential in lift produces a torque about the airplane's fore-and-aft axis resulting in roll about the axis.

The conventional flap type ailerons of the lower wings are replaced, in the present invention, by spoilers 40 allowing a pair of continuous booms 20 to be placed adjacent the trailing edge of lower wings 2 for substantially the length of each wing. Spoilers 40 are installed forward of booms 20 and are hinged at their leading edge. The spoilers, when in the closed position, present a surface substantially planar with adjoining upper surfaces of the wing. The spoilers perform substantially the same function as the ailerons of the upper wings and are operated simultaneously therewith.

Figure 5:
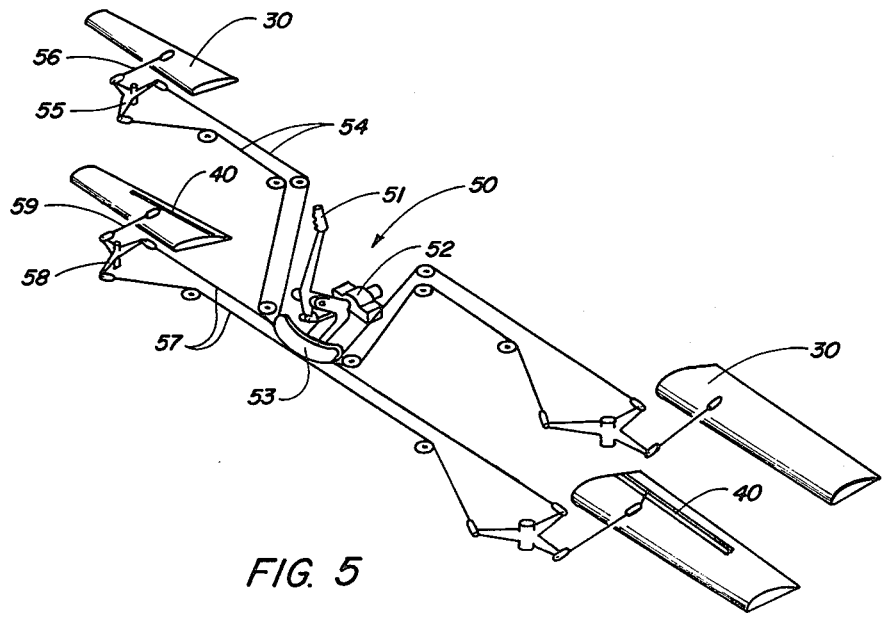
FIG. 5 is a schematic view of a preferred embodiment of the aileron-spoiler control system of the present invention.

Referring now to FIG. 5, control means 50 operable to control the ailerons and spoilers of upper and lower wings, respectively, are shown to advantage. Control means 50 includes a control stick 51 pivotable in retention member 52 to move aileron-spoiler sector 53 in a rocking motion. Spoiler wires 57 are connected to sector 53 in such a manner that the pivoting of sector 53 rotates spoiler bell cranks 58 connected to spoilers 40 by arms 59 to cause an upward or downward pivoting of spoilers 40 on their forwardly located hinges. Spoilers 40 must be forced open against large positive aerodynamic pressures acting on their outer surfaces and for this reason spoiler down wires may be eliminated. As sector 53 pivots about its axis, aileron control wires 54 connected to sector 53 in the same manner as spoiler wires 57 cause rotation of aileron bell cranks 55 connected to ailerons 30 by means of arms 56 to pivot upwardly or downwardly in synchronization with spoilers 40 located on the same side of the aircraft. Lateral control is therefore achieved by the differential action of the ailerons and spoilers on opposing sides of the aircraft. It is obvious that many other similar and conventional control means may be used to control the ailerons and spoilers as described; the particular type of control system not being critical to the invention.

Spray booms 20, of the present invention, are preferably constructed of extruded aluminum to define the trailing edge of the lower wings. One embodiment of the boom, as shown to advantage in FIG. 3, includes a housing 21 substantially A-shaped in cross section having a pair of converging outer longitudinal members 22 and a cross member 23 sealingly connecting opposing converging members 22 to define a longitudinal fluid conduit 25. The terminal free end of members 22 define a pair of legs 24 for attachment to the forward portion of each of the lower wings 2. Boom 20 may be attached as the trailing edge of wings 2 by any suitable means. Boom 20 has an outer surface which is symmetrical in shape so that the boom may be readily reversed end for end without altering the aerodynamics of the wings. Each boom includes a thickened portion 27 at the terminal juncture of members 22 for providing a base for the insertion of nozzles 60. Nozzles 60 are conventional and are preferably attached to boom 20 at the terminal trailing edge 27 by means of threads, not shown, engaging a threaded aperture extending through thickened portion 27 into duct 25 so that fluid conducted through duct 25 may be released through the nozzles. Nozzles 60, shown to advantage in FIG. 1 are uniformly spaced laterally along the length of the boom adjacent the trailing edge of the wing. The nozzles preferably engage threaded apertures through the thickened portion 27 of the boom.

A second embodiment of boom 20 is shown to advantage in FIG. 4. The second embodiment is substantially similar to the first embodiment but further includes at least one additional cross member 28 running longitudinally parallel with cross member 23 to define a plurality of conduits 25. Additionally legs 24 are each provided with an inwardly directed flange 26 perpendicular to legs 24. Flanges 26 provide an abutment against the terminal edges of wings 2 in the wings engagement with the boom. Legs 24 may be bent to conform with the mounting surface on the wings.

While booms 20 may be of any suitable size, typical measurements include a housing having converging members which are 0.062 inches in thickness, 4.5 inches in length from the terminal tip 27 to the terminal free end of legs 24; a tip 27 having a cross sectional thickness from conduit 25 to the terminal edge of tip 27 of 0.312 inches and a terminal end thickness of 0.350 inches; and wherein each converging member 22 slopes 7 degrees from normal or 14 degrees in relationship to each other. It is to be noted that the booms are symmetrical enabling an end-to-end reversal of the boom without any aerodynamic consequences. It is also to be noted that each boom extend substantially the length of the entire lower wing thereby providing a standardized spacing of nozzles 60 to provide a uniform spray pattern across substantially the entire length of the wing.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appeneded claims rather than by the foregoing description, and all changes which come within the meaning and range of equivalency of the claims are therefore to be embraced therein.

I claim:

1. An improved agricultural spray plane of the biplane type wherein the improvement comprises:

a pair of spray booms, each boom mounted on each of the lower wings defining a continuous trailing edge of each of the lower wings for substantially the length of each wing;

at least one spoiler mounted on the upper surface of each lower wing forward of said spray booms;

at least one aileron mounted on each of the upper wings; and means for simultaneously controlling ailerons and spoilers located on wings on opposing sides of the plane.

2. The apparatus as described in claim 1, wherein said spray booms each include a housing having converging upper and lower members and a connecting cross member defining a longitudinal fluid conduit extending the substantial length of respective wings, the conduits operable to receive and conduct spray materials, and a plurality of spray nozzles, each nozzle in fluid communication with the conduit and adapted to release spray material received from the conduits, during flight.

3. The apparatus as described in claim 2, wherein the exterior surface of the housings of each of said spray booms is symmetrical in configuration from the leading edge to the trailing edge so that each boom is operable when reversed end for end.

4. The apparatus as described in claim 1 wherein each of said booms includes a housing substantially A-shaped in cross section having substantially planer converging outer longitudinal members and at least one longitudinal cross member connecting said outer members to define at least one longitudinal fluid conduit, and a plurality of spray nozzles mounted and laterally spaced along the length of each of said booms and each nozzle in fluid communication with at least one of said conduits for spraying.

5. The apparatus as described in claim 4, wherein each of said booms includes a plurality of said cross members defining a plurality of parallel longitudinally extending fluid conduits, each of said spray nozzles adapted to communicate with a preselected conduit.

6. An improved agricultural spray plane of the biplane type wherein the improvement comprises:

a pair of spray booms, each boom mounted on one of the lower wings of the biplane and defining a continuous trailing edge of the wing to which it is mounted for substantially the length of the wing, each of said wings including a housing substantially A-shaped in cross section, each of said housings having symmetrically converging outer longitudinal members and at least one longitudinal cross member connecting said outer members to define at least one longitudinal fluid conduit, and a plurality of spray nozzles mounted and laterally spaced adjacent the trailing edge and along the length of each of said booms and each of said nozzles in fluid communication with one of said fluid conduits for spraying;

at least one spoiler mounted on the upper surface of each of the lower wings forward of said spray booms;

at least one aileron mounted on each of the upper wings; and means for simultaneously controlling said spoilers and ailerons located on wings on each of the opposing sides of the biplane.

7. The apparatus as described in claim 6 wherein each of said booms include the plurality of cross members defining a plurality of parallel longitudinally extending fluid conduits, each of said spray nozzles adapted to communicate with a preselected conduit.

* * * * *